United States Patent [19]

Bucci

[11] Patent Number: 4,860,714
[45] Date of Patent: Aug. 29, 1989

[54] IN-TANK FUEL PUMP ASSEMBLY FOR FUEL-INJECTED ENGINES

[75] Inventor: George H. Bucci, Tolland, Conn.

[73] Assignee: Whitehead Engineered Products, Inc., Meriden, Conn.

[21] Appl. No.: 898,432

[22] Filed: Aug. 20, 1986

[51] Int. Cl.⁴ ............................................. F02M 39/00
[52] U.S. Cl. .................................. 123/514; 123/509; 137/263
[58] Field of Search ............... 123/514, 509, 516, 495; 137/263, 113, 255

[56] References Cited

U.S. PATENT DOCUMENTS

| | | | |
|---|---|---|---|
| 1,953,808 | 4/1934 | Kenneweg | 123/514 |
| 3,101,771 | 8/1963 | McCuen | |
| 3,443,519 | 5/1969 | White | |
| 4,175,527 | 11/1979 | Sanada | 123/514 |
| 4,397,333 | 8/1983 | Liba | 123/514 |
| 4,409,930 | 10/1983 | Bury | 123/514 |
| 4,449,723 | 5/1984 | Shiratsulhi | |
| 4,503,885 | 3/1985 | Hall | 123/514 |
| 4,546,750 | 10/1985 | Brunell | 123/509 |
| 4,672,937 | 6/1987 | Fales | 123/514 |
| 4,683,864 | 8/1987 | Bucci | 123/514 |

FOREIGN PATENT DOCUMENTS

| | | |
|---|---|---|
| 2261394 | 6/1973 | Fed. Rep. of Germany . |
| 2804550 | 8/1979 | Fed. Rep. of Germany ...... 123/514 |
| 2844053 | 4/1980 | Fed. Rep. of Germany . |
| 0062958 | 4/1982 | Japan . |
| 1581978 | 12/1980 | United Kingdom . |

Primary Examiner—Carl Stuart Miller
Attorney, Agent, or Firm—Maurice M. Klee

[57] ABSTRACT

An in-tank, fuel pump assembly for fuel-injected engines is provided which includes a reservoir having a supply port for supplying fuel to the engine and a return port for receiving fuel returning from the engine. Within the reservoir are (1) an electrically-operated, high pressure pump, (2) a jet pump located at the bottom of the reservoir for entraining fuel into the reservoir, (3) a valve associated with the return port, and (4) a valve associated with the supply port. The output of the high pressure pump is routed to the jet pump and to the two valves whereby when the high pressure pump is not operating, both valves are closed, and when the high pressure pump is operating, both valves are open and the jet pump entrains fuel into the reservoir. The jet pump is sized to entrain more fuel into the reservoir than leaves the reservoir through the supply port thus producing a net flow of fuel from the bottom to the top of the reservoir. As a result of this flow and the arrangement of the various components of the assembly, cool fuel from the main fuel tank is supplied to the engine rather than hot fuel returning from the engine through the return port, thus avoiding the hot fuel problems experienced in the prior art.

8 Claims, 6 Drawing Sheets

IN-TANK FUEL PUMP ASSEMBLY FOR FUEL-INJECTED ENGINES

BACKGROUND OF THE INVENTION

1. Field of the Invention

This invention relates to fuel-injected engines and, in particular, to in-tank, high pressure, fuel pump assemblies for use with such engines.

2. Description of the Prior Art

In a fuel-injected engine, fuel is supplied at a relatively high pressure to one or more injectors which are connected directly to the engine cylinders or to an intake manifold leading to the cylinders. In the prior art, two electrically driven pumps have typically been used to deliver fuel to the injectors: a low pressure pump either near or in the vehicle's fuel tank and a high pressure pump connected to the injectors. For vehicles having two fuel tanks, e.g., medium duty and larger trucks, off-road vehicles, and the like, an additional low pressure pump has been used for the second tank.

In order to reduce the complexity and cost, including the cost of assembly, of such systems, efforts have been made to eliminate the low pressure pump by placing the high pressure pump directly in the vehicle's fuel tank. The primary problems raised by this approach have been in the area of insuring that there is a constant supply of fuel at the intake to the high pressure pump. Specifically, the problem has been to supply the high pressure pump with fuel under low fuel conditions and during times when the vehicle is navigating a sharp turn, traveling over a steep incline, or after the vehicle has been parked on an incline for an extended period of time.

Various approaches have been tried to solve the foregoing problems. For example, the high pressure pump has been housed in a reservoir within the vehicle's fuel tank and fuel has been routed to the reservoir to try to keep it filled. Specifically, the fuel returning from the engine has been routed to the reservoir, and, in some cases, the returning fuel has been used to power a jet pump to bring fuel into the reservoir from the main tank by means of Bernoulli forces.

To date, these approaches, rather than solving the problem, have raised problems of their own. In particular, filling the reservoir with fuel returning from the engine and then recycling that fuel back to the engine through the high pressure pump has been found to result in a "hot fuel" problem wherein the fuel is heated by the hot engine on each pass through the system and eventually reaches a temperature at which it can no longer be properly injected into the engine by the fuel-injection system.

As to using the returning fuel to power a jet pump, this approach has been found to be unsuccessful under conditions of high fuel consumption by the engine. Specifically, when the engine is using more fuel, less fuel is returned to the jet pump and thus less fuel is pulled into the reservoir by the jet pump. Accordingly, with time, the amount of fuel in the reservoir decreases, the temperature of the fuel supplied to the engine rises, and the overall performance of the engine and the fuel-injection system declines. Although theoretically it would be possible to solve this problem by using an oversized high pressure pump capable of supplying sufficient fuel to handle high fuel consumption conditions and still provide sufficient flow through the jet pump, the use of such a pump defeats the purpose of the change from the original two pump approach, namely, to reduce the overall cost of the system.

The present invention, as described in detail below, overcomes these problems by providing an in-tank, high pressure, fuel pump assembly which has minimal hot fuel problems and which entrains essentially a constant amount of fuel into its reservoir irrespective of the amount of fuel consumed by the vehicle's engine.

SUMMARY OF THE INVENTION

In view of the foregoing state of the art, it is an object of this invention to provide improved, in-tank, high pressure, fuel pump assemblies for use with fuel-injected vehicles. In particular, it is an object of this invention to provide such assemblies wherein hot fuel problems are minimized and wherein the performance of the assembly is essentially independent of the amount of fuel being consumed by the vehicle's engine.

It is a further object of the invention to provide in tank, high pressure, fuel pump assemblies wherein the supply and return lines connecting the assembly to the vehicle's engine are automatically closed when the vehicle's fuel pump is not in operation. It is another object of the invention to provide in-tank, high pressure, fuel pump assemblies for use with vehicles having multiple fuel tanks wherein fuel returning from the vehicle's engine is automatically routed to the fuel tank from which the fuel originated.

To achieve the foregoing and other objects, the invention in accordance with certain of its aspects provides apparatus for pumping fuel from a fuel tank to an engine comprising:

(a) a supply port leading from the apparatus to the engine;

(b) a fuel reservoir which includes an opening for connecting the interior of the reservoir to the interior of the fuel tank;

(c) means for mounting the reservoir in the fuel tank;

(d) pumping means for pumping fuel into the reservoir, said means being located within the reservoir in the region of the opening and including a nozzle and a venturi tube in alignment with the nozzle, the passage of fuel out of the nozzle and through the venturi tube causing fuel to be entrained through the opening into the interior of the reservoir:

(e) a high pressure pump having an inlet connected to the interior of the reservoir and a high pressure outlet; and (f) means for routing a first portion of the fuel leaving the high pressure outlet to the supply port and a second portion of the fuel leaving the high pressure outlet to the pumping means whereby fuel is delivered to the engine from the reservoir through the supply port and fuel is entrained into the reservoir by means of the fuel passing through the pumping means.

In accordance with other aspects of the invention, the apparatus further includes:

(a) a return port leading to the reservoir for receiving fuel returning from the engine; and (b) a valve associated with the return port and the high pressure pump, the valve being open when the pump is operating so that fuel can pass between the engine and the reservoir and the valve being closed when the pump is not operating so that fuel cannot pass between the engine and the reservoir.

In accordance with certain preferred embodiments of the invention, the valve controlling flow through the return port includes a diaphragm and a spring, the spring moving the diaphragm to a position where the valve is closed, and the diaphragm being connected to the high pressure outlet of the pump so that when the pump is operating, fuel from the high pressure outlet moves the diaphragm against the force of the spring to a position where the valve is open.

In accordance with additional aspects of the invention, apparatus is provided for supplying fuel to an engine which comprises:

(a) a supply manifold for receiving fuel to be supplied to the engine;

(b) a return manifold for receiving fuel returning from the engine;

(c) a first fuel tank;

(d) a first pump associated with the first fuel tank and having an inlet connected to the first fuel tank and a high pressure outlet;

(e) first means for delivering fuel from the high pressure outlet of the first pump to the supply manifold;

(f) second means for delivering fuel from the return manifold to the first fuel tank;

(g) first and second hydraulically-operated valves associated with the first and second means, respectively, and with the first pump, each of the valves being open when the first pump is operating so that fuel can pass through the first and second means and being closed when the first pump is not operating so that fuel cannot pass through the first and second means;

(h) a second fuel tank;

(i) a second pump associated with the second fuel tank and having an inlet connected to the second fuel tank and a high pressure outlet;

(j) third means for delivering fuel from the high pressure outlet of the second pump to the supply manifold;

(k) fourth means for delivering fuel from the return manifold to the second fuel tank;

(l) third and fourth hydraulically-operated valves associated with the third and fourth means, respectively, and with the second pump, each of the valves being open when the second pump is operating so that fuel can pass through the third and fourth means and being closed when the second pump is not operating so that fuel cannot pass through the third and fourth means; and (m) means for selectively activating the first or second pump whereby when the first pump is activated fuel passes from the first tank to the engine and back to the first tank and when the second pump is activated fuel passes from the second tank to the engine and back to the second tank.

The accompanying drawings, which are incorporated in and constitute part of the specification, illustrate the preferred embodiments of the invention, and together with the description, serve to explain the principles of the invention.

BRIEF DESCRIPTION OF THE DRAWINGS

FIGS. 2-9 illustrate a particularly preferred construction for the apparatus of the present invention, wherein:

FIG. 2 is a perspective view showing the apparatus mounted in a fuel tank.

FIG. 3 is an exploded view of the components housed within the reservoir portion of the apparatus.

FIG. 4 is a top of view of the reservoir portion of the apparatus.

FIG. 5 is a side view of the components housed within the reservoir portion of the apparatus.

FIG. 6 is a cross-sectional view along lines 6—6 in FIG. 4 showing the jet pump, check valve, and shuttle valve components of the apparatus.

FIG. 7 is a cross-sectional view along lines 7—7 in FIG. 4 showing the internal structure of the jet pump.

FIG. 8 is a cross-sectional view along lines 8—8 in FIG. 4 illustrating the routing of fuel from the high pressure outlet of the high pressure pump to the jet pump, check valve, and shuttle valve.

FIG. 9 is a perspective view from below showing the construction of the bottom portion of the jet pump.

DESCRIPTION OF THE PREFERRED EMBODIMENTS

Figure 1:
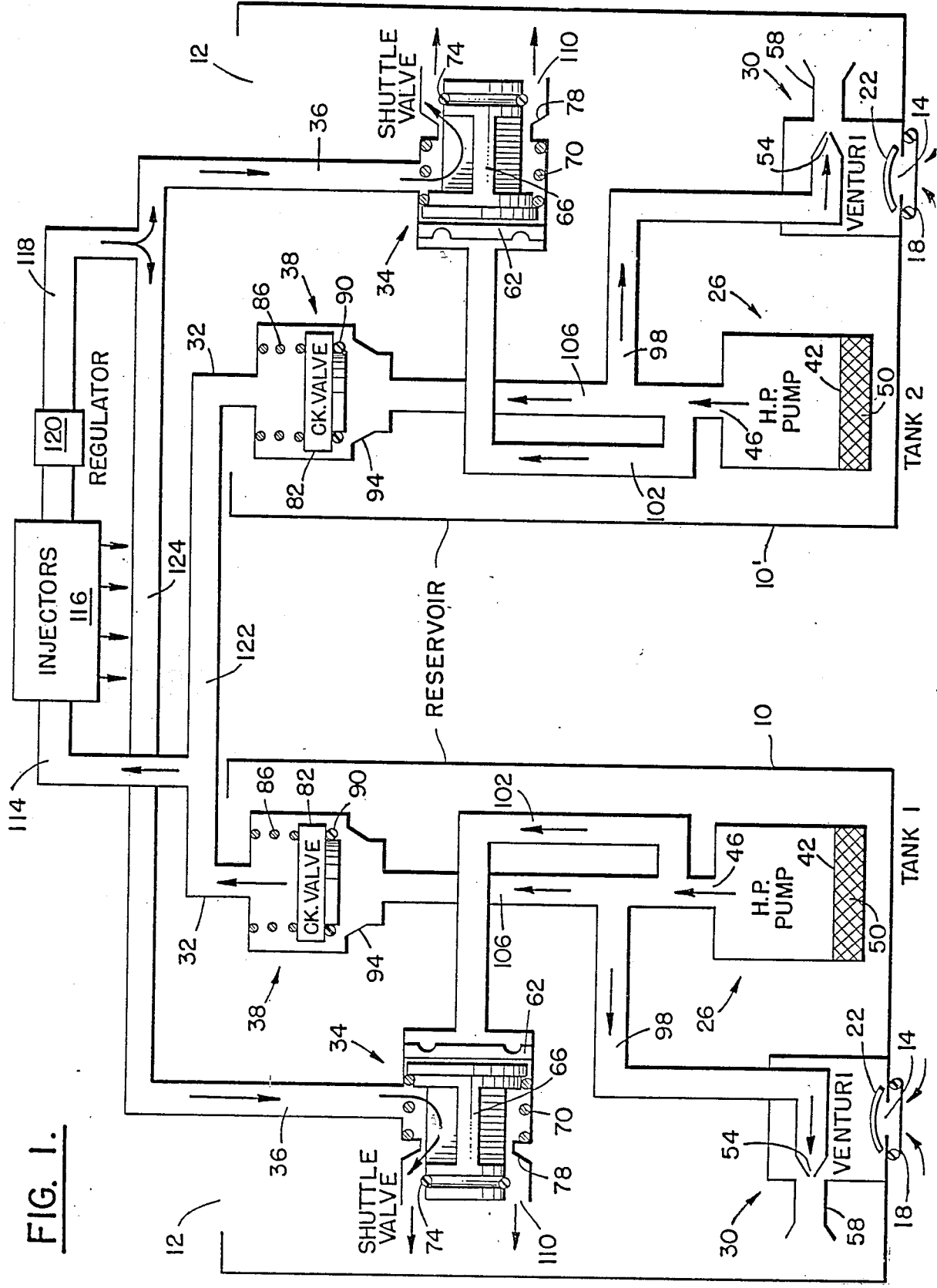
FIG. 1 is a schematic diagram illustrating the application of the present invention to a fuel-injected engine supplied by fuel from two fuel tanks. The unnumbered arrows in this figure and in FIGS. 2-9 indicate the direction of fuel flow through the various components of the apparatus.

With reference now to the drawings, wherein like reference characters designate like or corresponding parts throughout the several views, there is shown in FIG. 1 a schematic diagram illustrating the application of the present invention to a fuel-injected engine which is supplied with fuel from two fuel tanks. Although the invention will be described in connection with such a two fuel tank embodiment, it is to be understood that this description is for purposes of illustration only and that various features of the invention can be practiced with a single fuel tank. Similarly, the invention can be used with engines which are supplied with fuel from more than two fuel tanks.

As indicated in FIG. 1, reservoirs 10 and 10' are mounted in fuel tanks 1 and 2, respectively, the location of the reservoir being preferably at or near the bottom of the fuel tank. Each reservoir includes a top opening 12 and a bottom opening 14, each of which connect the interior of the reservoir to the interior of its respective main tank. Below each bottom opening is mounted a filter 18, which filters the fuel entering the reservoir from the main tank through the bottom opening. Above each bottom opening is a one-way check valve 22, which prevents fuel from passing out of the reservoir into the main tank through the bottom opening. Each reservoir also includes a supply port 32, through which fuel is supplied to the engine, and a return port 36, through which fuel returns to the reservoir from the engine.

Within each reservoir is a high pressure pump 26, a jet pump 30, a shuttle valve 34, and a check valve 38 The high pressure pump is electrically-operated and is of standard design for use with fuel-injected engines. It includes an inlet 42 and a high pressure outlet 46. The inlet is preferably covered by a filter 50.

Jet pump 30 includes nozzle 54 and venturi tube 58. Flow of fuel out of nozzle 54 and through venturi tube 58 causes a reduction in pressure in the region of opening 14 relative to the pressure in the main fuel tank, which in turn, causes fuel to be entrained into the reservoir from the fuel tank.

Shuttle valve 34, which controls the flow of fuel returning from the engine through return port 36, has an open position in which fuel can pass through the valve and a closed position in which fuel cannot pass through the valve. The valve includes diaphragm 62, piston 66, spring 70, and O-ring 74. Spring 70 urges the valve into its closed position wherein O-ring 74 is in contact with surface 78 formed in the valve body. As discussed below, when high pressure pump 26 is operating, fuel from the high pressure outlet 46 of the pump moves diaphragm 62 against the force of spring 70. This movement of the diaphragm opens the valve by moving O-ring 74 out of engagement with surface 78.

Check valve 38 also has an open position in which fuel can pass through the valve and a closed position in which fuel cannot pass through the valve. This valve allows fuel to flow out of the reservoir through supply port 32. The valve includes piston 82, spring 86, and O-ring 90. Spring 86 urges the valve into its closed position wherein O-ring 90 is in contact with surface 94 formed in the valve body. When high pressure pump 26 is operating, the valve is opened by fuel from high pressure outlet 46 moving piston 82 so as to bring O-ring 90 out of contact with surface 94.

As shown in FIG. 1, the output of high pressure pump 26 is routed to each of jet pump 30, shuttle valve 34, and check valve 38 by lines 98, 102, and 106, respectively. Accordingly, when the pump is in operation, both valves will be open, fuel will be leaving the reservoir through supply port 32 and returning through return port 36, and the jet pump will be entraining fuel into the reservoir. On the other hand, when the pump is not in operation, both valves will be closed, fuel will neither be leaving nor returning to the reservoir, and the jet pump will not be filling the reservoir with fuel. Fuel, however, will not leave the reservoir because of check valve 22.

Jet pump 30 is preferably sized so that it entrains more fuel into the reservoir than leaves the reservoir through supply port 32 under maximum fuel consumption conditions. For example, it has been found convenient to select a nozzle 54 which, for the operating parameters of the engine, allows approximately one unit of fuel to pass through the jet pump for every four units of fuel which pass out of supply port 32, and to size venturi tube 58 so that approximately five units of fuel are entrained through opening 14 for every unit of fuel passing through nozzle 54. For this combination, approximately six units of fuel enter the reservoir for every four units of fuel leaving the reservoir through supply port 32.

This extra entrainment provides a safety margin to insure that there is always fuel at inlet 42 of high pressure pump 26. The return of fuel to the reservoir through return port 36 and shuttle valve 34 also helps insure that there is always fuel at the inlet to the pump, especially under low fuel conditions where there may not be fuel in the main tank in the region of opening 14.

As mentioned above, recycling of returning fuel is, in general, undesirable since it leads to hot fuel problems. To avoid these problems, outlet 110 of shuttle valve 34 is oriented horizontally and is set at a level above the level of inlet 42 to high pressure pump 26. Since the returning fuel is warmer than the fuel being entrained into the bottom of the reservoir by jet pump 30, there is, in general, no thermal gradient tending to move the returning fuel below the level of outlet 110. Moreover, for a jet pump sized so that more fuel is pumped into the reservoir by the jet pump than is pumped out of the reservoir by the high pressure pump, there will be a net flow of fuel from the bottom to the top of the reservoir and out of top opening 12. Such a flow will carry the warm, returning fuel out of the reservoir into the main tank and away from the inlet to the high pressure pump. Thus, in accordance with the invention, warm fuel will only reach the inlet to the high pressure pump when fuel is not present at the inlet 14 to reservoir 10, so that the only fuel available for pumping to the engine is the unused fuel returning from the engine, as may occur, for example, under shifting fuel or low fuel conditions.

As mentioned above, the present invention can be used for engines having only a single fuel tank. In such a case, one of the reservoirs shown in FIG. 1 is mounted in the fuel tank, supply port 32 is connected directly to intake 114 to injectors 116, and return port 36 is connected directly to the output 118 of regulator 120. As is standard in the art, regulator 120 provides a constant pressure head at injectors 116. A typical setting for regulator 120 is on the order of 39 pounds per square inch at idle and 30 pounds per square inch at open throttle.

When applied to single fuel tank engines, the present invention provides a variety of advantages and improvements over the prior art, including: (1) only one high pressure pump is employed, as opposed to both a high pressure pump and a low pressure pump; (2) cool fuel is supplied to the inlet of the high pressure pump even under conditions of high fuel consumption by the engine: (3) returning warm fuel is available to the pump under low fuel or fuel shifting conditions, but is isolated from the inlet to the pump under normal conditions; (4) both the supply port and return port open automatically when the high pressure pump is on and close automatically when it is off; and (5) the high pressure pump, jet pump, and the valves controlling flow to and from the engine can readily be mounted within the reservoir, thus providing a single unit which lowers assembly, replacement and repair costs.

When applied to engines having multiple fuel tanks, supply port 32 of each reservoir is connected to a common supply manifold 122, which in turn, is connected to intake 114 to injectors 116. Similarly, return ports 36 are connected to a common return manifold 124 which is connected to output 118 of regulator 120. Because of the automatic opening and closing of check valves 38 and shuttle valves 34, switching between tanks, in accordance with the invention, simply involves turning off the high pressure pump in the tank which no longer is to be used and turning on the high pressure pump in the tank which is to be used, the switching of the routing of fuel to and from the active tank being taken care of automatically by the common supply and return manifolds and by the automatic opening and closing of the various check and supply valves.

Manifolds 122 and 124 need not have any particular configuration and can simply involve connecting all of the supply ports to intake 114 and all of the return ports to output 118. Switching between high pressure pumps can be done by conventional means known in the art, such as through the use of a single pole, double throw switch mounted in a convenient location.

Figure 2:
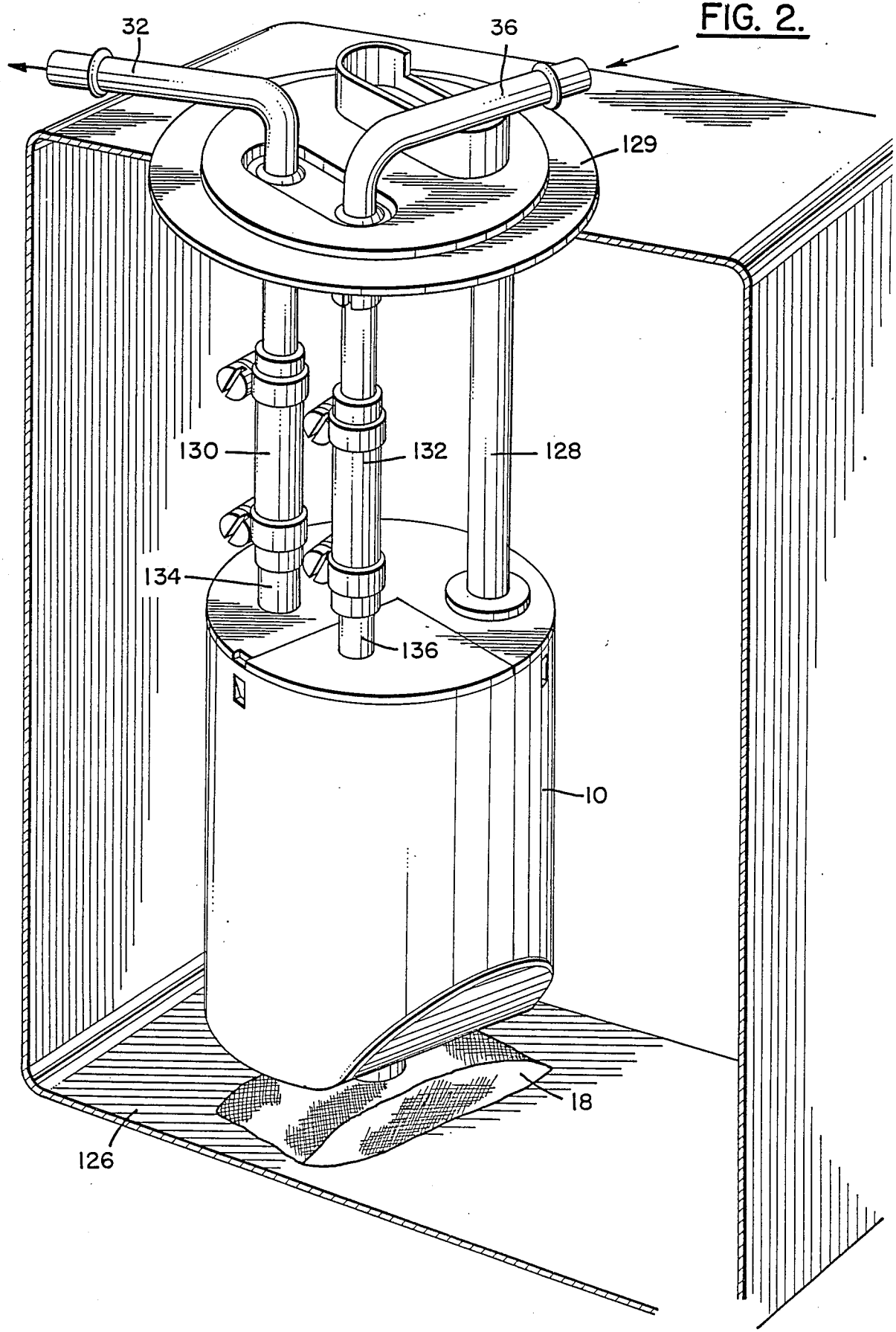

Turning now to FIGS. 2-9, these figures show a particularly preferred construction for the apparatus of the present invention. As shown in FIG. 2, reservoir 10 is mounted within fuel tank 126 by means of mounting plate 129 which carries supply port 32 and return port 36. Mounting plate 129 is connected to reservoir 10 by stiffening rod 128. Supply port 32 and return port 36 are connected to the reservoir by flexible hoses 130 and 132, respectively, which lead to supply nozzle 134 and return nozzle 136, respectively (see FIG. 3). The lengths of stiffening rod 128 and flexible hoses 130 and 132 are selected so that when mounting plate 129 is connected to fuel tank 126, filter 18, which is attached to the bottom of the reservoir, is located on or just above the bottom of the tank. Rather than using nozzles 134 and 136, and hoses 130 and 132, ports 32 and 36 can be connected directly to reservoir 10 using, for example, grommets at the junction of these ports with the reservoir. The reservoir includes opening 131 at its top to allow excess fuel which is pumped into the reservoir by the jet pump to escape (see FIGS. 3 and 4.

Figure 3:
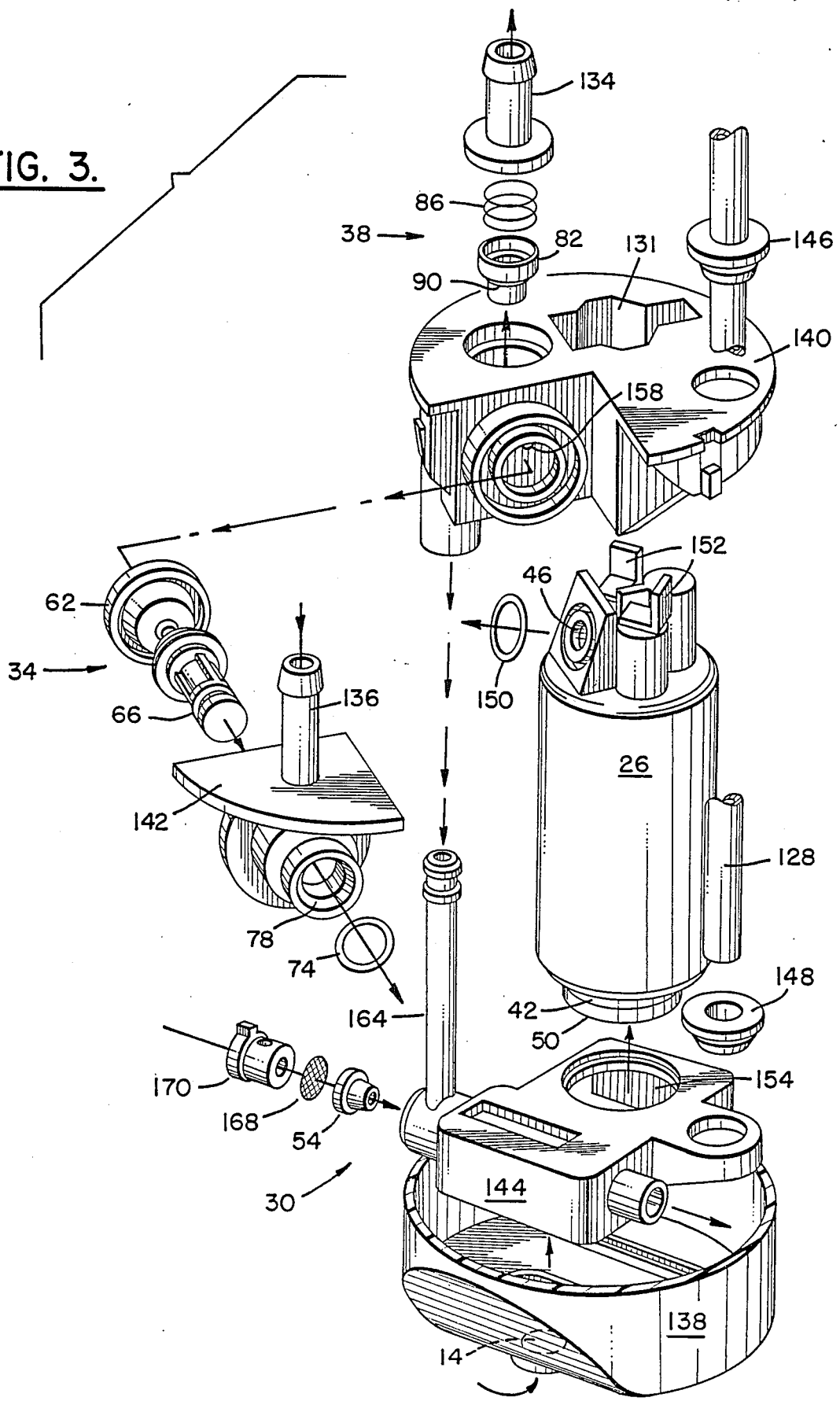
Figure 4:
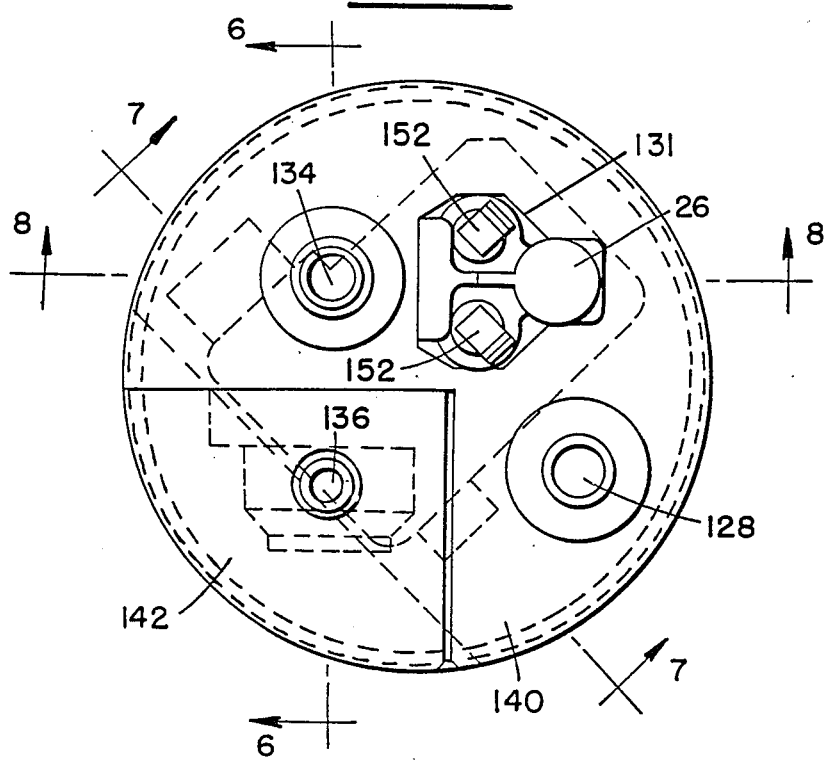
Figure 5:
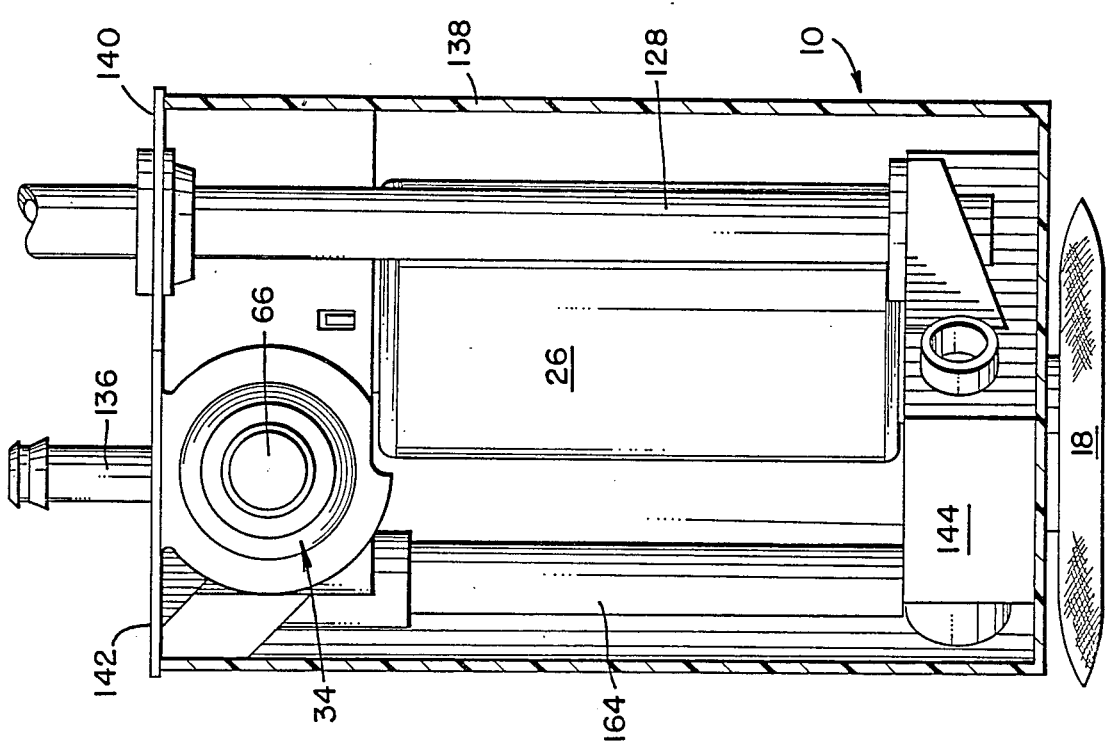

As shown most clearly in FIGS. 3 and 5, reservoir 10 is composed of reservoir can 138, main housing 140, and shuttle valve housing 142. Within the reservoir are located high pressure pump 26, shuttle valve 34, check valve 38, and jet pump 30 formed in jet block 144. Stiffening rod 128 passes through the reservoir and is connected to main housing 140 and jet block 144 by grommets 146 and 148, respectively.

High pressure pump 26 is mounted between main housing 140 and opening 154 in jet block 144. Inlet 42 to the high pressure pump is covered by filter 50. The pump's high pressure outlet 46 leads into main housing 140, the housing and the pump being sealed by O-ring 150. The high pressure pump includes spade lugs 152 which are connected to a suitable wiring harness (not shown) through which the pump is energized.

Figure 7:
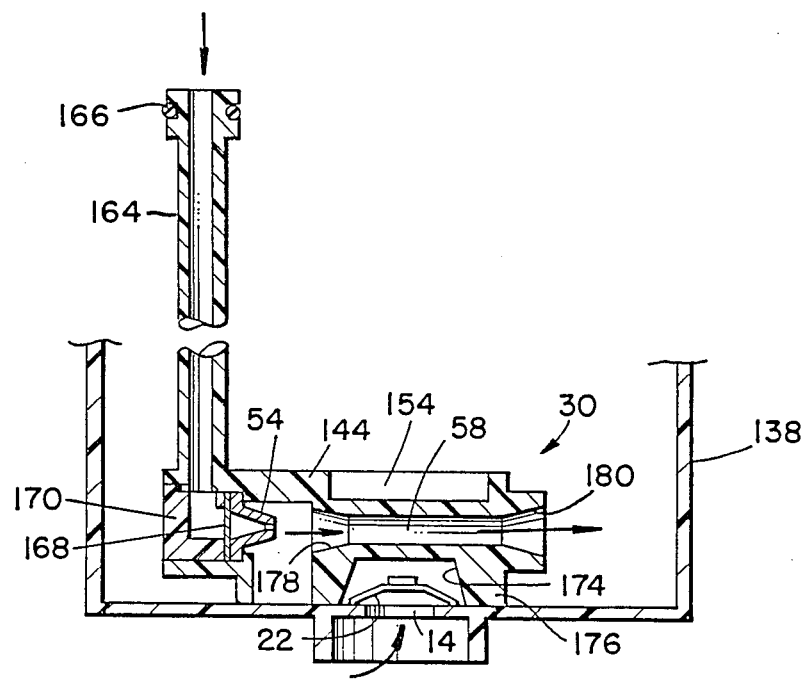
Figure 6:
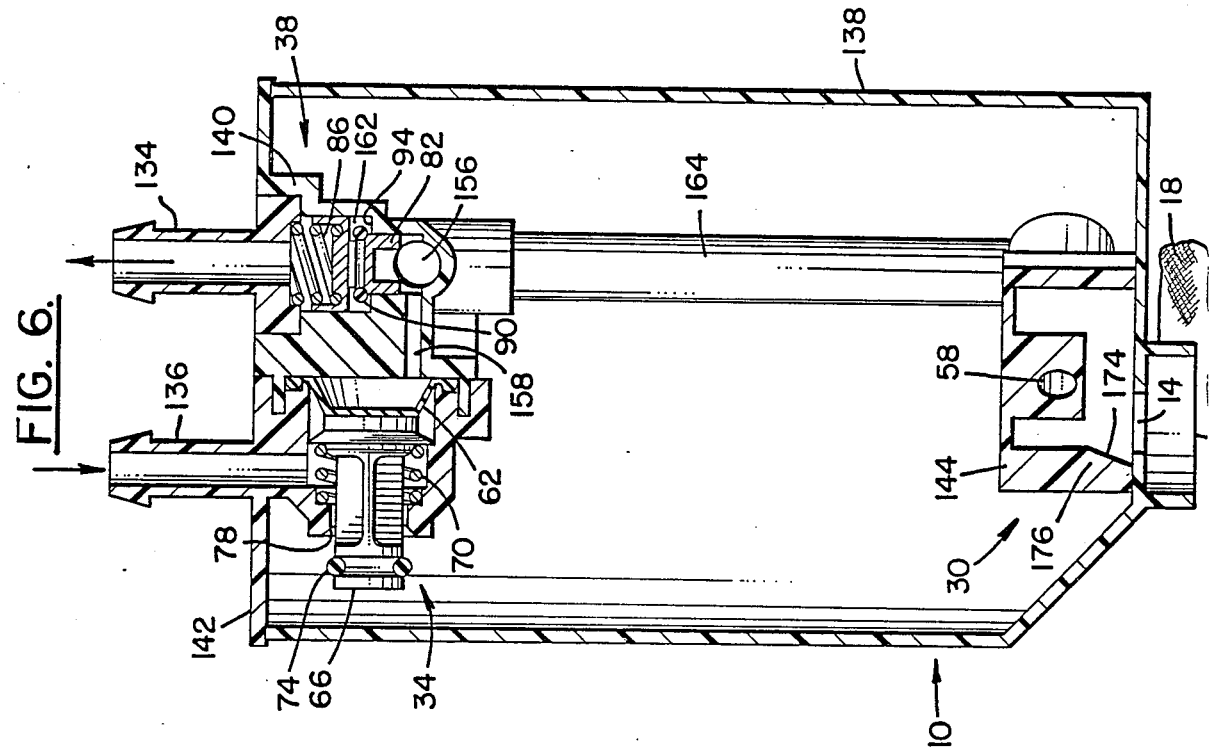
Figure 8:
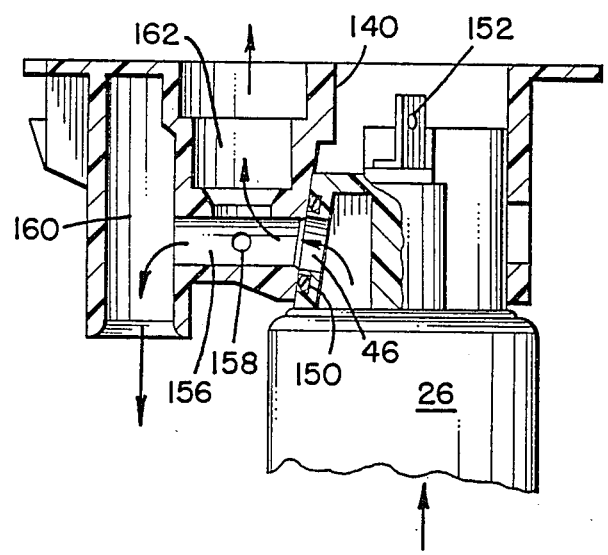

As can best be seen in FIG. 8, main housing 140 includes chamber 156 which receives the output from the high pressure outlet 46 of high pressure pump 26. Chamber 156, in turn, is connected to passage 158 and to chambers 160 and 162. Chamber 162 receives check valve 38, orifice 158 is connected to shuttle valve 34, and chamber 160 is connected to jet block 144 by connecting tube 164, O-ring 166 being used to form a seal between chamber 160 and connecting tube 164 (see FIG. 7). By means of these interconnected passageways in main housing 140, the output of the high pressure pump is routed to the check valve, the shuttle valve, and the jet pump.

As discussed above in connection with FIG. 1, check valve 38 includes piston 82, spring 86, and O-ring 90, which mates with surface 94; shuttle valve 34 includes moveable diaphragm 2, piston 66, spring 70, and O-ring 74 which mates with surface 78; and jet pump 30 includes nozzle 54 and venturi tube 58. Check valve 38 can be conveniently set to open at a pressure of approximately 4 pounds per square inch, while shuttle valve 34 can be set to open at approximately fifteen pounds per square inch. The fifteen pounds per square inch value for the opening of the shuttle valve allows this valve to function as a means for relieving pressure within the fuel injection system which may build up when the engine is not in use, e.g., through heating of the injection manifold by residual engine heat.

Figure 9:
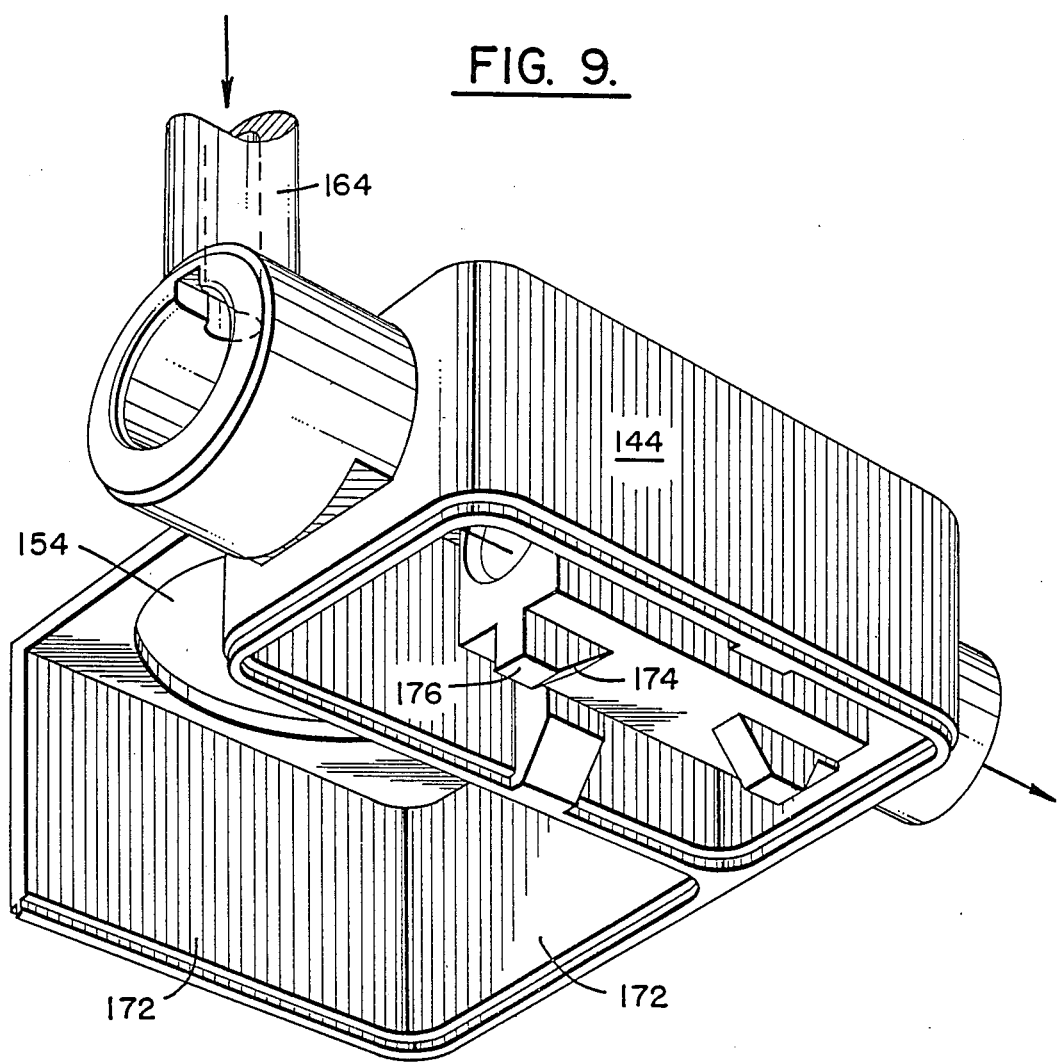

As shown in FIG. 7, jet pump 30 preferably includes a filter 168 for filtering the fuel entering nozzle 54, the filter and nozzle being secured within jet block 144 by support 170. As shown in FIG. 9, jet block 144 includes baffles 172 whereby the fuel leaving the jet pump is isolated from the region of opening 154 which receives inlet 42 to high pressure pump 26. As also shown in that figure, the output of the jet pump is located diametrically opposite from the inlet to the high pressure pump and the output is aimed away from the inlet. In this way, the inlet to the high pressure pump sits in a relatively calm pool of fuel and is uneffected by the turbulence and, in some cases, frothing which results from the operation of the jet pump when entraining air.

As also shown in FIG. 9, jet block 144 includes projections 176 for retaining check valve 22 over opening 14 (see also FIG. 7). The inward surfaces 174 of these projections are tapered so that the check valve will not catch on the projections during use.

The following dimensions for nozzle 54 and venturi 58 have been found suitable for use with fuel-injected automobile engines, wherein the operating pressure of the engine, as set by regulator 120, is on the order of 40 pounds per square inch and wherein high pressure pump 26 produces a total flow of about 100 liters/hour when operating through such a regulator: diameter of nozzle orifice—approximately 0.023 inches: diameter of venturi tube—approximately 0.2 inches: length of venturi tube—approximately 1.0 inch: taper angle of bell mouth inlet 178 to venturi tube—approximately 5°; taper angle of flared outlet 180 from venturi tube—approximately 13°. Venturi tube 58, inlet 178 and outlet 180 are preferably formed with smooth surfaces to avoid generating excess turbulence in the fuel entrained by the jet pump.

Jet pumps formed with smooth surfaces and having the foregoing dimensions, when connected to a 100 liter per hour high pressure pump and to a fuel-injected automobile engine operating at approximately 40 pounds per square inch, have been found to have a flow rate through the jet pump of approximately 20 liters per hour and to entrain approximately 5 liters of fuel for every 1 liter of fuel passing through the jet pump.

The components making up the fuel pump assembly of the present invention can be made of standard materials used in the automotive industry. For example, nozzle 54 can be made of stainless steel, diaphragm 62 can be made of fluorosilicone, and reservoir can 138, main housing 140, shuttle valve housing 142, and jet block 144 can be made of nylon or polyester.

Although specific embodiments of the invention have been described and illustrated, it is to be understood that modifications can be made without departing from the invention's spirit and scope. For example, valves and pumps having constructions other than those illustrated in the figures can be used in the practice of the invention. Similarly, the components of the invention can be arranged relative to one another in a variety of configurations other than those shown.

What is claimed is:

1. Apparatus for pumping fuel from a fuel tank to an engine comprising:
   (a) a supply port for carrying fuel from the apparatus to the engine;
   (b) a pump having an inlet connected to the fuel tank and a high pressure outlet;
   (c) means for routing fuel leaving the high pressure outlet to the supply port;
   (d) a return port connected to the fuel tank for receiving fuel returning from the engine; and
   (e) a valve associated with the return port and including a diaphragm and a spring, said diaphragm having a first position in which the valve is closed so that fuel cannot pass between the engine and the fuel tank through the return port, and a second position in which the valve is open so that fuel can pass between the engine and the fuel tank through the return port, said spring urging the diaphragm towards its first position; and (f) means for connecting the high pressure outlet of the pump to the valve so that when the pump is operating, fuel from the high pressure outlet moves the diaphragm to its second position against the force of the spring.

2. Apparatus for pumping fuel from a fuel tank to an engine comprising:

(a) a supply port for carrying fuel from the apparatus to the engine;

(b) a fuel reservoir which includes an opening for connecting the interior of the reservoir to the interior of the fuel tank;

(c) means for mounting the reservoir in the fuel tank so as to locate the opening of the reservoir in the region of the bottom of the fuel tank;

(d) pumping means for pumping fuel into the reservoir, said means being located within the reservoir in the region of the opening and including a nozzle and a venturi tube in alignment with the nozzle, the passage of fuel out of the nozzle and through the venturi tube causing fuel to be entrained through the opening into the interior of the reservoir;

(e) a high pressure pump having an inlet connected to the interior of the reservoir and an output of high pressure fuel; and (f) means for routing a first portion of the output of high pressure fuel to the supply port and a second portion of the output of high pressure fuel to the pumping means whereby fuel is delivered to the engine from the reservoir through the supply port and fuel is entrained into the reservoir by means of the fuel passing through the pumping means.

3. The apparatus of claim 1 further including:

(a) a return port leading to the reservoir or receiving fuel returning from the engine; and (b) a valve associated with the return port, and the high pressure pump, the valve being open when the pump is operating so that fuel can pass between the engine and the reservoir and the valve being closed when the pump is not operating so that fuel cannot pass between the engine and the reservoir.

4. The apparatus of claim 3 wherein the valve includes a diaphragm and a spring, said diaphragm having a first position in which the valve is closed and a second position in which the valve is open, said spring urging the diaphragm towards its first position, and wherein the apparatus includes means for connecting a portion of the output of high pressure fuel to the valve so that when the pump is operating, said portion can move the diaphragm to its second position against the force of the spring.

5. The apparatus of claim 3 wherein the inlet to the high pressure pump is connected to the reservoir at a level below the level at which fuel is returned to the reservoir from the engine through the return port.

6. The apparatus of claim 3 wherein the fuel returning to the reservoir from the engine through the return port enters the reservoir horizontally.

7. The apparatus of claim 2 wherein the outlet from the pumping means is separated from the inlet to the high pressure pump by a baffle.

8. The apparatus of claim 2 wherein the opening is located at the bottom of the reservoir and wherein the first portion of the output of high pressure fuel is less than the sum of the second portion plus the amount of fuel entrained into the reservoir by the pumping means so that more fuel enters the reservoir through the opening than leaves the reservoir through the supply port thereby creating a net flow of fuel from the bottom to the top of the reservoir.

* * * * *